UNITED STATES PATENT OFFICE.

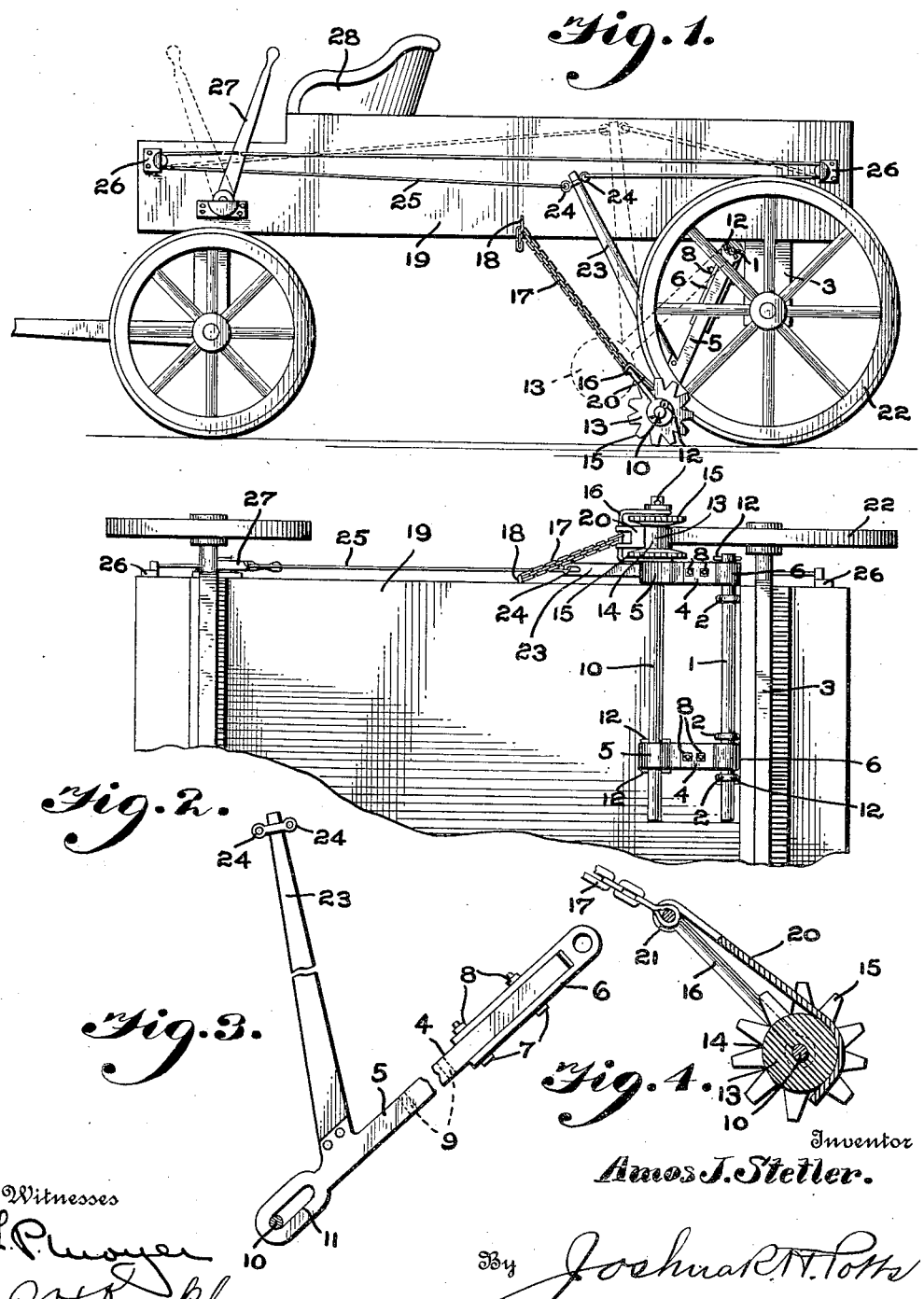

AMOS J. STETLER, OF WEST POINT, PENNSYLVANIA.

VEHICLE-BRAKE.

1,084,976.  Specification of Letters Patent.  Patented Jan. 20, 1914.

Application filed November 11, 1912. Serial No. 730,553.

*To all whom it may concern:*

Be it known that I, AMOS J. STETLER, a citizen of the United States, residing at West Point, in the county of Montgomery and State of Pennsylvania, have invented certain new and useful Improvements in Vehicle-Brakes, of which the following is a specification.

My invention relates to improvements in vehicle brakes, the object of the invention being to provide an improved brake which is adapted for use in connection with any form of vehicle, and which is adapted to move into position in front of the wheel and in contact with the ground, so that the forward movement of the vehicle tends to press the brake device into the ground and effectually checks the vehicle.

A further object is to provide an improved rotary brake device adapted to be moved into position to be engaged at its intermediate portion by the rim of a wheel, so that its toothed or notched ends are pressed into engagement with the ground which effectually holds the vehicle against forward movement and prevents it from lateral skidding upon slippery pavements as well as upon ice and frozen ground.

With these and other objects in view, the invention consists in certain novel features of construction and combinations and arrangements of parts as will be more fully hereinafter described and pointed out in the claims.

In the accompanying drawings Figure 1 is a view in side elevation illustrating in full lines my improvements in operative position, and in dotted lines in elevated position. Fig. 2 is a fragmentary bottom plan view of Fig. 1. Fig. 3 is a view in elevation on an enlarged scale illustrating one of the brake arms and the operating lever, and Fig. 4 is a view in section on an enlarged scale through the center of my improved rotary brake shoe.

1 represents a shaft which is secured in eyes 2 fixed to the rear axle bar 3, and to this shaft 2 forwardly and downwardly projecting arms 4 are connected. The arms 4 each comprise two sections 5 and 6, the latter bifurcated as indicated in Fig. 3, and adapted to be secured to member 5 by the bolt 7 and nuts 8, it being understood that member 5 is provided with a plurality of holes 9 in any of which the bolts 7 are adapted to be positioned so that the length of these arms may be adjusted to exactly suit conditions. Two of these arms are provided which support at their free ends, a shaft 10. This shaft extends through a slot 11 in the outer arm 4, but the opening in the inner arm is only large enough to allow of the movement of the shaft in the other arm. In other words, only the outer arm is slotted, while there is a somewhat loose fit between the shaft 10 and the inner arm, and to hold this shaft 10 against longitudinal movement, pins 12 are projected therethrough at opposite sides of the inner arm.

On the outer end of the shaft 10, my improved rotary brake 13 is mounted to turn. This brake shoe is in the form of a spool with its intermediate portion 14 cylindrical, and of appreciably less diameter than its ends 15. These ends 15 are notched or serrated as shown so that they present to the ground, sharp engaging corners which bite into the ice, snow or ground, and prevent any possibility of lateral or longitudinal slipping.

A bail 16 is supported at its ends on the shaft 10 at opposite sides of the rotary brake shoe 13, and is connected by a chain 17 with a hook 18 on the vehicle body 19, and this chain limits the downward and rearward movement of the brake shoe.

A wheel contacting plate 20 at its upper bifurcated end is bent around the intermediate member of bail 16 forming a hinged juncture 21, and the lower portion of this plate 20 curves around the intermediate portion 14 of the brake shoe. The wheel 22 engages this plate 20, and hence the rotary movement of the wheel is not imparted to the brake shoe, nor is the rotary movement of the brake shoe imparted to the wheel. Furthermore, the wheel cannot ride over the rotary brake shoe, but merely jams against the same to effectually stop the forward movement of the vehicle.

A lever 23 is fixed at its lower end to the outer arm 4, and at its upper end is provided with eyes 24 to which the respective ends of a cable 25 are secured. This cable 25 is passed around pulleys 26 on the body 19 of the vehicle, and is secured to a lever 27 located convenient to the operator's seat 28.

While I have illustrated a particular means for raising the rotary brake shoe, it is to be understood that I might employ other means for the purpose, and I might mount the brake in various other ways, but in any event the rotary brake shoe would be so supported that when elevated it will be out of contact with the wheel, but when permitted to lower, will be engaged by the wheel.

In operation, the brake shoe is normally elevated as indicated in dotted lines in Fig. 1. When it is desired to stop the vehicle, the parts are moved to the position shown in full lines, when the rotary brake shoe will fall into position below and in front of the wheel. The wheel rim will engage plate 20 and bear downwardly upon the rotary brake shoe, causing the latter, while rolling along the ground, to bite into the ground and effectually stop the vehicle, also preventing any lateral skidding movement.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a vehicle, of a movable support, a rotary brake shoe movably mounted on the support, said brake shoe having a cylindrical intermediate portion and enlarged serrated ends, means limiting the rearward movement of the brake shoe, and a plate connected to said last-mentioned means and interposed between the cylindrical portion of the shoe and the wheel of the vehicle, substantially as described.

2. The combination with a vehicle, of a movable support, a rotary brake shoe movably mounted on the support, said brake shoe having a cylindrical intermediate portion and enlarged serrated ends, a flexible device connected to the vehicle body, a bail connecting the flexible device with the brake shoe, whereby the rearward movement of the brake shoe is limited, and a plate connected to the bail and interposed between the cylindrical portion of the brake shoe and the wheel of the vehicle, substantially as described.

3. The combination with a vehicle, wheels supporting the vehicle, pivoted arms, a shaft supported by said pivoted arms, a rotary brake shoe mounted on said shaft, a bail straddling the rotary brake shoe, a plate connected to the bail and interposed between the brake shoe and the wheel, and a flexible device connecting the bail with the body of the vehicle, substantially as described.

4. The combination with a vehicle, wheels supporting the vehicle, pivoted arms, a shaft supported by said pivoted arms, a rotary brake shoe mounted on said shaft, a bail straddling the rotary brake shoe, a plate connected to the bail and interposed between the brake shoe and the wheel, a flexible device connecting the bail with the body of the vehicle, a lever secured to one of said arms, and means on the vehicle body for moving the lever to raise and lower the brake shoe, substantially as described.

5. The combination with a vehicle body, wheels supporting the vehicle, pivoted arms adjustable longitudinally, a shaft supported in said arms, and movable longitudinally of one of said arms, a bail on said shaft, a chain connecting said shaft with the body of the vehicle, a rotary brake shoe on the shaft inside of the bail, a plate pivotally connected to the bail bent around the rotary brake shoe and engaged by the wheel of the vehicle, a lever fixed to one of said arms, pulleys on the vehicle body, a flexible device passed around said pulleys and secured to the lever, and an operating lever secured to the flexible device, substantially as described.

In testimony whereof I have signed my name to this specification in the presence of two subscribing witnesses.

AMOS J. STETLER.

Witnesses:
C. R. ZIEGLER,
S. W. FOSTER.